US010852623B2

(12) United States Patent
Kim et al.

(10) Patent No.: US 10,852,623 B2
(45) Date of Patent: Dec. 1, 2020

(54) CAMERA MODULE

(71) Applicant: Samsung Electro-Mechanics Co., Ltd., Suwon-si (KR)

(72) Inventors: Jae Kyung Kim, Suwon-si (KR); Bo Sung Seo, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/196,128

(22) Filed: Nov. 20, 2018

(65) Prior Publication Data

US 2019/0377238 A1 Dec. 12, 2019

(30) Foreign Application Priority Data

Jun. 8, 2018 (KR) .................. 10-2018-0066394

(51) Int. Cl.
*G03B 9/06* (2006.01)
*G03B 5/04* (2006.01)
*G03B 13/36* (2006.01)

(52) U.S. Cl.
CPC .............. *G03B 9/06* (2013.01); *G03B 5/04* (2013.01); *G03B 13/36* (2013.01); *G03B 2205/0015* (2013.01); *G03B 2205/0069* (2013.01)

(58) Field of Classification Search
CPC ...................................................... G03B 9/06
See application file for complete search history.

(56) References Cited

U.S. PATENT DOCUMENTS

| 5,325,142 | A | 6/1994 | Depatie et al. | |
| 8,333,521 | B2 | 12/2012 | Viglione | |
| 10,506,146 | B2* | 12/2019 | Seo | H04N 5/2252 |
| 2006/0033974 | A1 | 2/2006 | Sato | |
| 2008/0137348 | A1* | 6/2008 | Yasuyuki | H02K 26/00 362/324 |
| 2012/0057859 | A1* | 3/2012 | Byon | G03B 9/06 396/510 |
| 2012/0076486 | A1* | 3/2012 | Bai | G03B 9/06 396/463 |
| 2012/0194796 | A1* | 8/2012 | Nakajima | G03B 9/06 355/71 |

(Continued)

FOREIGN PATENT DOCUMENTS

| JP | 2006-053409 A | 2/2006 |
| KR | 10-2009-0012497 A | 2/2009 |

(Continued)

OTHER PUBLICATIONS

Korean Office Action dated Oct. 9, 2019 in corresponding Korean Patent Application No. 10-2018-0066394 (12 pages in English, 8 pages in Korean).

*Primary Examiner* — Clayton E. LaBalle
*Assistant Examiner* — Dennis Hancock
(74) *Attorney, Agent, or Firm* — NSIP Law

(57) ABSTRACT

A camera module includes a housing including a lens module, blades disposed on an object side of the lens module to consecutively form apertures having various sizes, a magnet portion including a driving magnet opposing a driving coil and being moveable rectilinearly, and a rotating plate interlocked with the magnet portion and the blades to convert linear movement of the magnet portion to rotational movement.

20 Claims, 11 Drawing Sheets

(56) References Cited

U.S. PATENT DOCUMENTS

| | | | | |
|---|---|---|---|---|
| 2018/0284571 A1* | 10/2018 | Park | .......................... | G03B 9/02 |
| 2018/0284572 A1* | 10/2018 | Nagao | ..................... | G03B 17/14 |
| 2018/0343370 A1* | 11/2018 | Park | ..................... | H04N 5/2254 |
| 2019/0141219 A1* | 5/2019 | Oh | ........................... | G02B 7/09 |
| 2019/0377239 A1* | 12/2019 | Lee | .......................... | G03B 9/06 |
| 2020/0007729 A1* | 1/2020 | Ha | ......................... | H04N 5/238 |

FOREIGN PATENT DOCUMENTS

| | | |
|---|---|---|
| KR | 10-1058020 B1 | 8/2011 |
| KR | 10-2012-0032433 A | 4/2012 |
| KR | 10-2014-0107903 A | 9/2014 |
| KR | 10-1477247 B1 | 12/2014 |
| KR | 10-2018-0045239 A | 5/2018 |

* cited by examiner

CAMERA MODULE

CROSS-REFERENCE TO RELATED APPLICATION

This application claims the benefit under 35 USC 119(a) to Korean Patent Application No. 10-2018-0066394 filed on Jun. 8, 2018 in the Korean Intellectual Property Office, the entire disclosure of which is incorporated herein by reference for all purposes.

BACKGROUND

1. Field

The following description relates to a camera module.

2. Description of Related Art

Recently, a camera module has generally been employed in portable electronic devices such as tablet PCs, laptops, and the like, as well as smartphones. A general digital camera has a mechanical stop to change an amount of incident light depending on a surrounding environment, but it may be difficult to provide a separate stop in a camera module used in small-sized electronic products such as portable electronic devices, due to structural and spatial limitations.

For example, a weight of a camera module may be increased due to all the components required to drive a stop, and such an increase in weight may lead to degradation in an autofocusing function. Also, in the case in which a power connection portion for driving a stop, such as a coil, or the like, is provided in a stop, a power connection portion can be stuck when a lens moves up and down during autofocusing adjustment, or other problems may occur.

There also has been demand for a function of accurately implementing various sizes of aperture of a stop module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing including a lens module, blades disposed on an object side of the lens module to consecutively form apertures having various sizes, a magnet portion including a driving magnet opposing a driving coil and being moveable rectilinearly, and a rotating plate interlocked with the magnet portion and the blades to convert linear movement of the magnet portion to rotational movement.

The camera module may include a base to accommodate the rotating plate, and the base may include a protrusion extended in an optical axis direction along a side surface of the lens module.

The magnet portion may be disposed in the protrusion and may move back and forth in a direction approximately perpendicular to the optical axis direction.

The blades may consecutively form the apertures having the various sizes by expanding and retracting around the optical axis according to a movement of the magnet portion with respect to the protrusion.

The rotating plate may rotate about an optical axis.

The rotating plate may include a driving protrusion inserting portion, the magnet portion may include a driving protrusion, and the driving protrusion may be inserted into the driving protrusion inserting portion.

The driving protrusion inserting portion may be inclined to a movement direction of the magnet portion.

Each of the blades may include a fixed shaft inserting portion and a driving shaft inserting portion, the fixed shaft inserting portion may be rotatably inserted into a respective fixed shaft on the base, and the driving shaft inserting portion may be inserted into a respective driving shaft on the rotating plate.

Each of the blades may include a fixed protrusion inserting portion and a driving shaft, the fixed shaft protrusion portion may be rotatably inserted into a respective fixed shaft on the base, and the driving shaft may be inserted into a respective driving shaft inserting portion on the rotating plate.

The driving shaft inserting portion may be lengthened in one direction and may be inclined to a rotation direction of the rotation plate.

A number of fixed shafts on the base may correspond to a number of the blades, and when the fixed shafts are sequentially connected, the fixed shafts may form a regular polygon.

The driving coil may be disposed in the housing.

The camera module may include a position sensor disposed to oppose the driving magnet.

The rotating plate may be disposed closer to the optical axis than the fixed shafts.

The rotating plate may be disposed farther away from the optical axis than the fixed shafts.

The blades may include three blades or six blades.

In another general aspect, a camera module includes a housing having an approximately square box shape, a lens module accommodated in the housing, and a stop module including blades that consecutively form apertures having various sizes. The housing includes a first optical image stabilization (OIS) driving coil to provide driving force to allow the lens module to move in a first direction perpendicular to an optical axis direction, a second OIS driving coil to provide driving force to allow the lens module to move in a second direction perpendicular to the optical axis direction and the first direction, an auto focusing (AF) driving coil to provide driving force to allow the lens module to move in the optical axis direction, and a stop driving coil to drive the blades on four surfaces of the housing parallel to the optical axis direction, respectively.

In another general aspect, a camera module includes a lens module, a magnet portion including a driving magnet opposing a driving coil to be moveable rectilinearly, a rotating plate interlocked with the magnet portion to convert linear movement of the magnet portion to rotational movement, and blades disposed on an object side of the lens module and interlocked with the rotating plate. The blades expand and retract around an optical axis based on the rotational movement.

The blades may expand and retract around the optical axis to form a variably sized aperture.

At least two of the blades may overlap each other in an optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
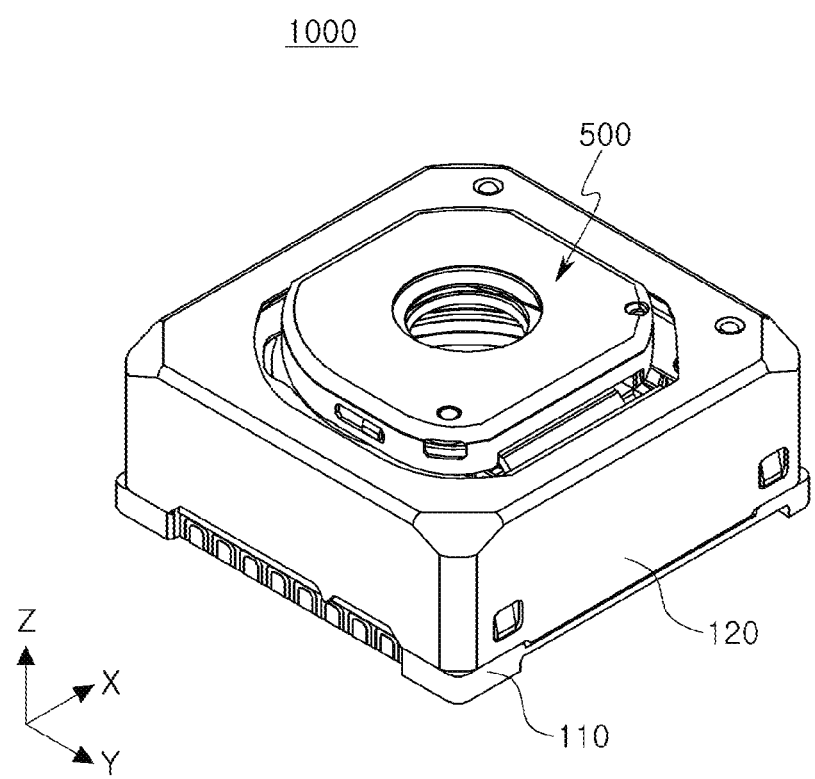
FIG. 1 is a perspective diagram illustrating a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
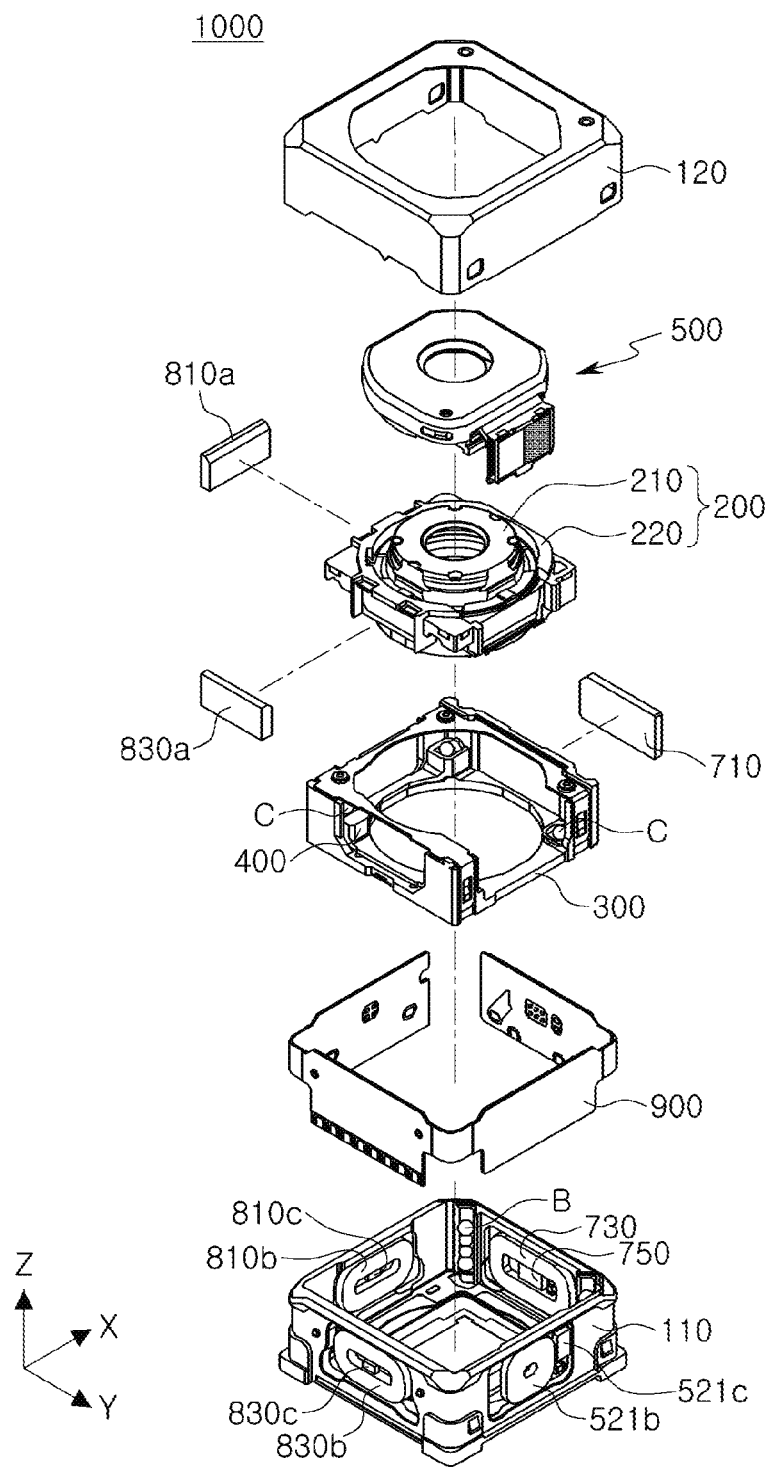
FIG. 2 is an exploded perspective diagram illustrating a camera module according to an example.

FIG. 1 is a perspective diagram illustrating a camera module according to an example. FIG. 2 is an exploded perspective diagram illustrating a camera module according to an example.

Figure 3A:
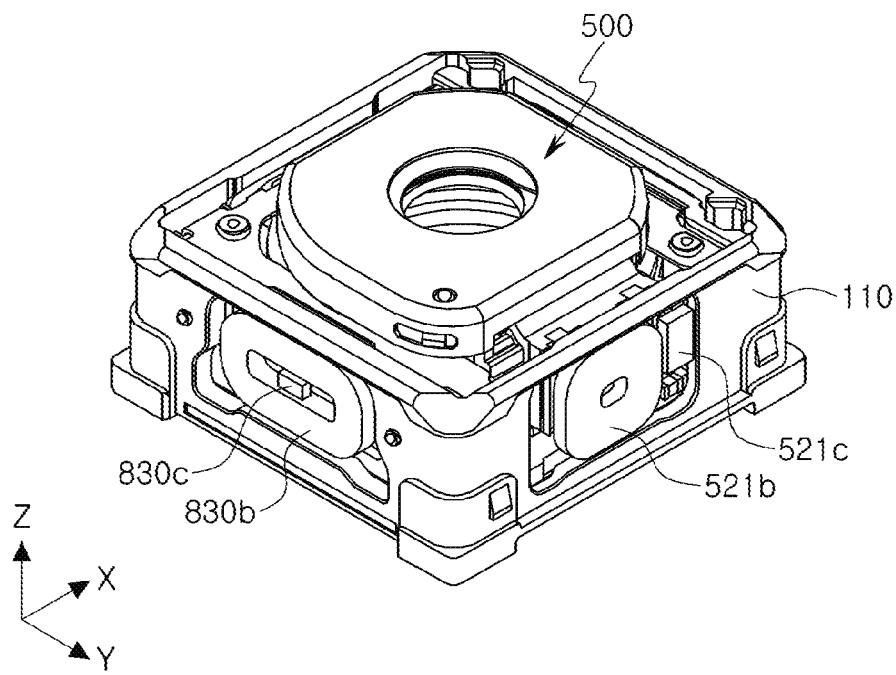
FIG. 3A is a perspective diagram partially illustrating a camera module according to an example.
Figure 3B:
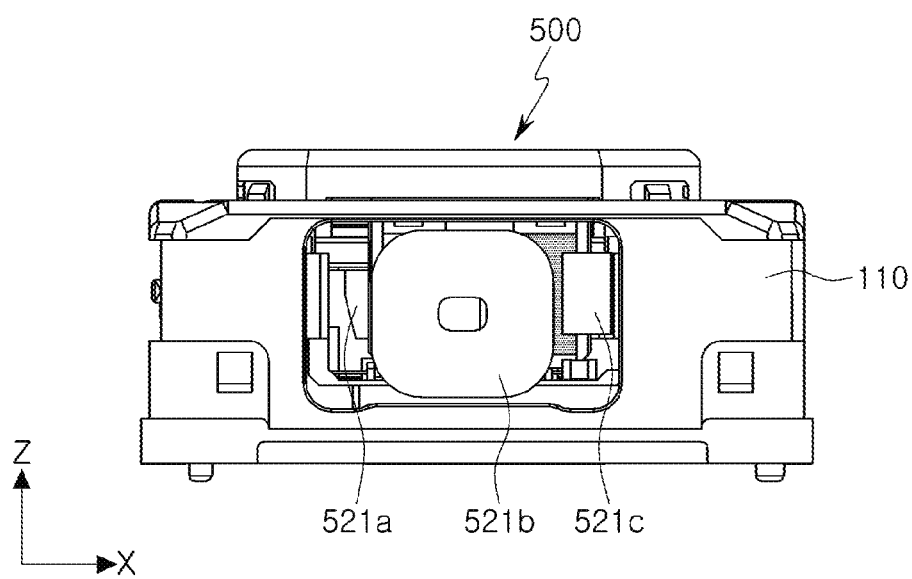
FIG. 3B is a profile view of the camera module illustrated in FIG. 3A.

FIG. 3A is a perspective diagram partially illustrating a camera module according to an example. FIG. 3B is a profile view of the camera module of FIG. 3A.

Referring to FIGS. 1 to 3B, a camera module 1000 may include a lens module 200, a carrier 300, a guide portion 400, a stop module 500, a housing 110, and a case 120.

A lens module 200 may include a lens barrel 210 having a plurality of lenses for photographing an object, and a holder 220 accommodating the lens barrel. The plurality of lenses may be disposed inside the lens barrel 210 along an optical axis. The lens module 200 may be accommodated in the carrier 300.

The lens module 200 may be configured to be movable in an optical axis direction for focus adjustment. For example, the lens module 200 may move in an optical axis direction along with the carrier 300 by a focus adjusting portion.

The focus adjusting portion may include a magnet 710 generating driving force in an optical axis direction, and a coil 730. A position sensor 750, such as a hole sensor, may be provided to sense a position of the lens module 200 in an optical axis direction, and a position of the carrier 300 in an optical axis direction.

The magnet 710 may be mounted on the carrier 300. For example, the magnet 710 may be mounted on one surface of the carrier 300.

The coil 730, such as an AF driving coil, and the position sensor 750 may be mounted on the housing 110. For example, the coil 730 and the position sensor 750 may be fixed to the housing to oppose the magnet 710. The coil 730 and the position sensor 750 may be mounted on a substrate 900, and the substrate 900 may be mounted on the housing 110.

The magnet 710 may be a movable member mounted on the carrier 300 and moving in an optical axis direction along with the carrier 300, and the coil 730 and the position sensor 750 may be fixed members fixed to the housing 110.

Once power is applied to the coil 730, the carrier 300 may be moved in an optical axis direction by electromagnetic force between the magnet 710 and the coil 730, and the position sensor 750 may sense a position of the carrier 300 in an optical axis direction.

Because the lens module 200 is accommodated in the carrier 300, the lens module 200 may move in an optical axis direction along with the carrier 300 as the carrier 300 moves.

The stop module 500 may be mounted on an upper portion (object side portion) of the lens module 200 and may move in an optical axis direction along with the lens module 200.

When the carrier 300 moves, a rolling member B may be disposed between the carrier 300 and the housing 110 to reduce friction between the carrier 300 and the housing 110. The rolling member B may be a ball type member.

The rolling member B may be disposed on both side portions of the magnet 710 (or the coil 730).

A yoke may be mounted on the substrate 900. For example, the yoke may be disposed to face the magnet 710 with the coil 730 interposed between the yoke and the magnet 710.

Between the yoke and the magnet 710, attraction force may be applied in a direction perpendicular to an optical axis direction.

The rolling member B may continue to be in contact with the carrier 300 and the housing 110 by the attraction force generated between the yoke and the magnet 710.

The yoke may also serve to allow magnetic force of the magnet 710 to be focused. Accordingly, magnetic leakage may be prevented.

For example, the yoke and the magnet 710 may form a magnetic circuit.

To correct an image-shake caused by a user hand-shake, or the like, the lens module 200 may move in a first direction (for example, in the x-direction or y-direction of FIG. 2), perpendicular to an optical axis direction, and a second direction (for example, in the x-direction or y-direction of FIG. 2), perpendicular to an optical axis direction and the first direction.

For example, when camera-shake occurs due to user hand-shake, and the like, while an object is imaged, a shake correction portion may correct camera-shake by applying a relative displacement corresponding to the camera-shake to the lens module 200.

The guide portion 400 may be accommodated in an upper portion of the carrier 300, and the holder 220 may be mounted on an upper portion of the guide portion 400. A rolling member C serving as a rolling bearing may be provided between the carrier 300 and the guide portion 400 in an optical axis direction, and between the guide portion 400 and the holder 220 in an optical axis direction.

When the lens module 200 moves in the first and second directions perpendicular to an optical axis direction, the guide portion 400 may be configured to guide the lens module 200.

For example, the lens module 200 may relatively move in the first direction about the guide portion 400, and the guide portion 400 and the lens module 200 may move together in the second direction within the carrier 300.

The shake correction portion may include a plurality of magnets 810a and 830a, and a plurality of coils 810b and 830b, which are a first optical image stabilization (OIS) driving coil and a second OIS driving coil. A plurality of position sensors 810c and 830c, such as hole sensors, may be provided to sense positions of the lens module 200 in the first and second directions.

Among the magnets 810a and 830a and the coils 810b and 830b, the magnet 810a and the coil 810b may be disposed to face each other in the first direction and generate driving force in the first direction, and the magnet 830a and the coil 830b may be disposed to face each other in the second direction and generate driving force in the second direction.

The magnets 810a and 830a may be mounted on the lens module 200, and the coils 810b and 830b, which face the magnets 810a and 830a and the position sensors 810c and 830c, may be fixed to the housing 110. For example, the coils 810b and 830b and the position sensors 810c and 830c may be mounted on the substrate 900, and the substrate 900 may be mounted on the housing 110.

The magnets 810a and 830a may be movable members moving in the first and second directions along with the lens module 200, and the coils 810b and 830b and the position sensors 810c and 830c may be fixed members fixed to the housing 110.

A ball member C may be provided to support the guide portion 400 and the lens module 200. The ball member C may serve to guide the guide portion 400 and the lens module 200 during the shake correction process.

The ball member C may be provided between the carrier 300 and the guide portion 400, between the carrier 300 and the lens module 200, and between the guide portion 400 and the lens module 200.

In the case in which driving force occurs in the first direction, the ball members C disposed between the carrier 300 and the guide portion 400 and between the carrier 300 and the lens module 200 may roll in the first direction. Accordingly, the ball members C may guide the guide portion 400 and the lens module 200 moving in the first direction.

In the case in which driving force occurs in the second direction, the ball members C disposed between the guide portion 400 and the lens module 200 and between the carrier 300 and the lens module 200 may roll in the second direction. Accordingly, the ball members C may guide the lens module 200 moving in the second direction.

The lens module 200 and the carrier 300 may be accommodated in the housing 110. For example, the housing 110 may have a square box shape in which an upper portion (in the z-direction in FIG. 2) and a lower portion (in the z-direction of FIG. 2) are opened, and the lens module 200 and the carrier 300 may be accommodated in an internal space of the housing 110.

A printed circuit substrate having an image sensor may be disposed in a lower portion of the housing 110.

The case 120 may be coupled to the housing 110 to seal an external surface of the housing 110, and may serve to protect internal components of the camera module. The case 120 may block electromagnetic waves.

For example, the case 120 may block electromagnetic waves generated in the camera module to prevent the electromagnetic waves from affecting other electronic components in a portable electronic device.

Also, as various electronic components may be provided in a portable electronic device in addition to a camera module, the case 120 may block electromagnetic waves generated in the electronic components to prevent the electromagnetic waves from affecting the camera module.

The case 120 may be formed of a metal material and may be grounded to a ground pad provided in a printed circuit substrate, and accordingly, electromagnetic waves may be blocked.

The stop module 500 may be configured to selectively change the amount of light incident to the lens module 200.

For example, the stop module 500 may consecutively implement different sizes of apertures by using a plurality of blades. Depending on surrounding environment, light may be incident through one of the different sizes of apertures.

Figure 4:
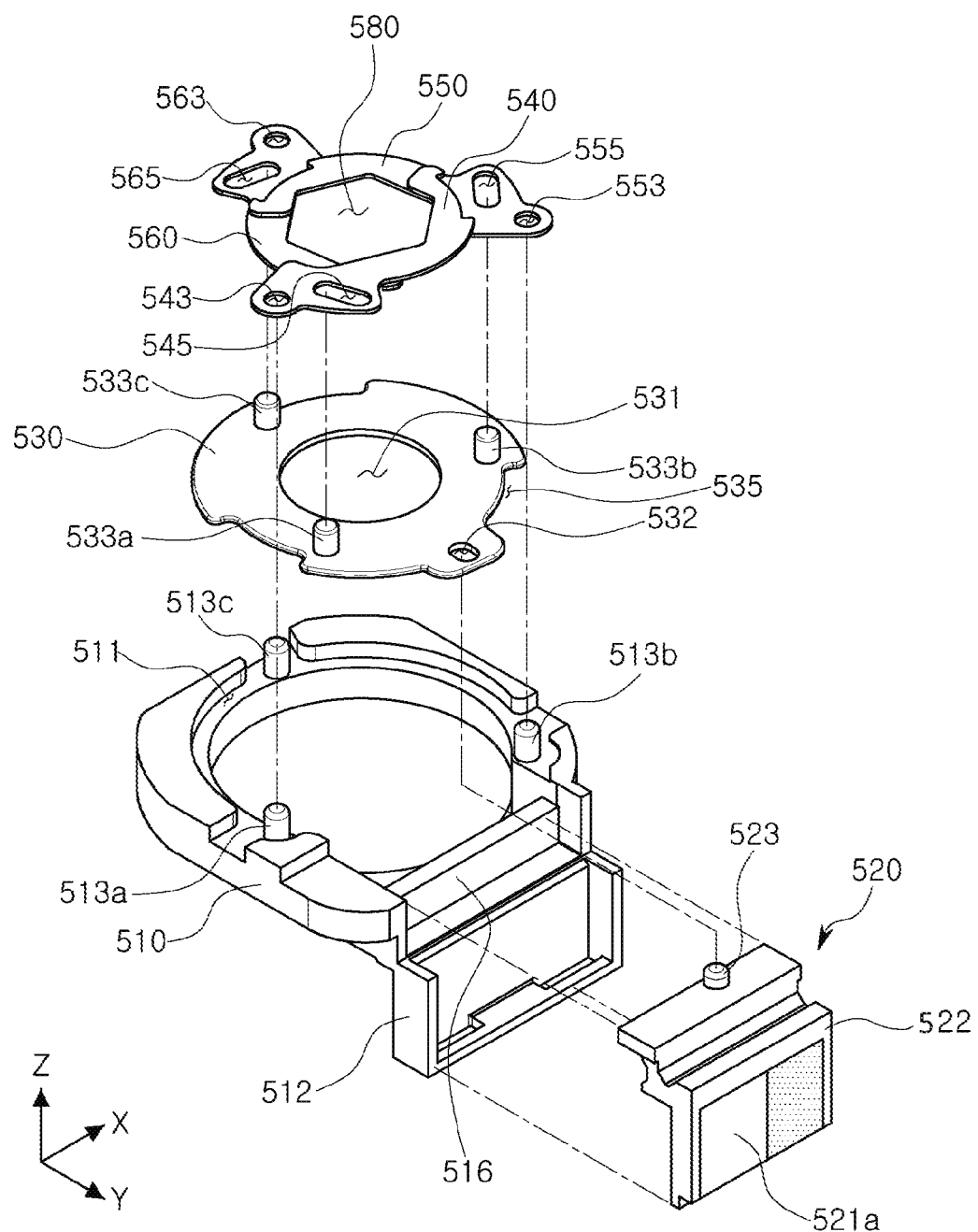
FIG. 4 is an exploded perspective diagram illustrating a stop module according to an example.
Figure 5:
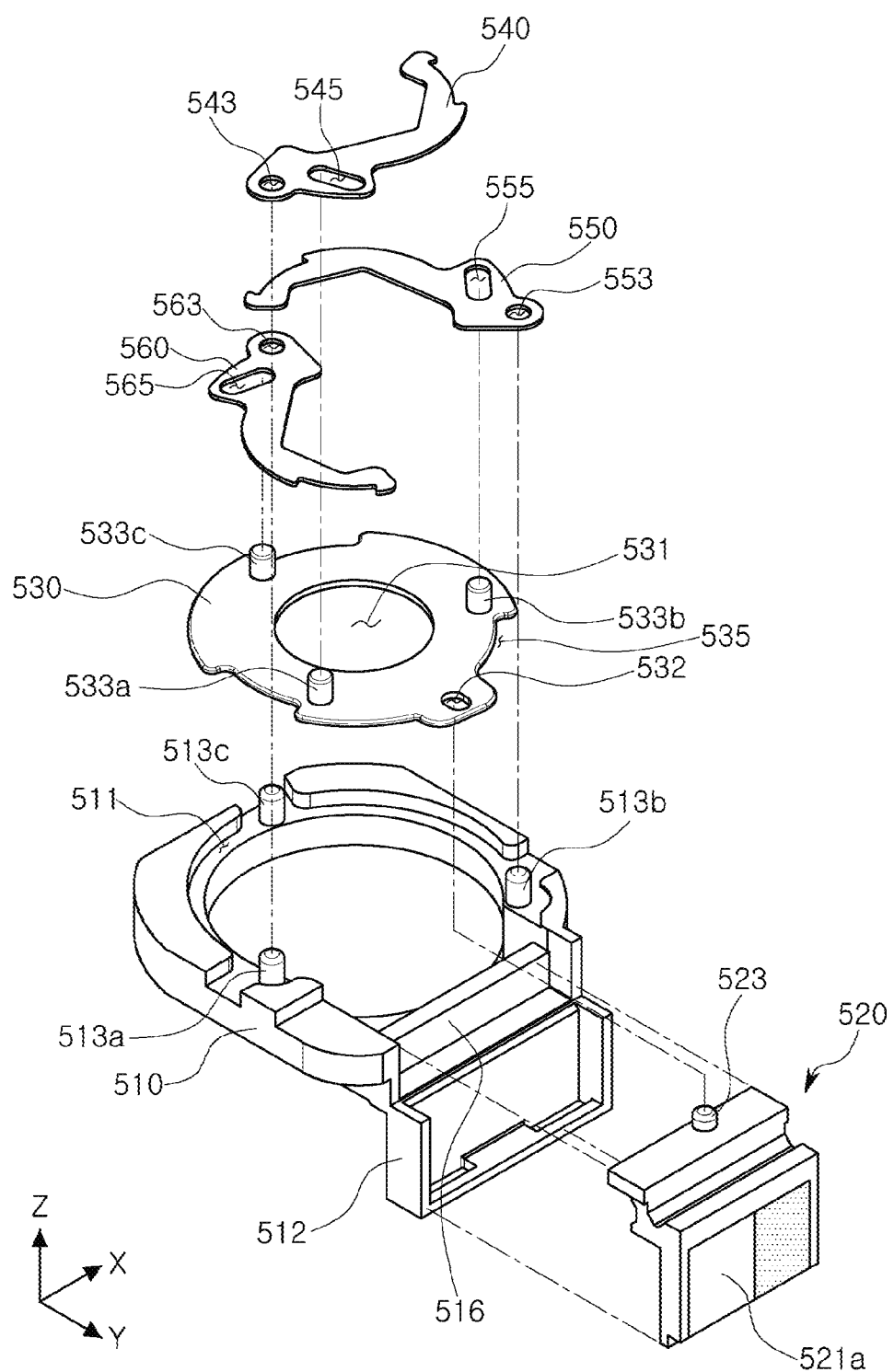
FIG. 5 is an exploded perspective diagram illustrating a blade and a rotating plate provided in a stop module according to an example.

FIG. 4 is an exploded perspective diagram illustrating a stop module according to an example. FIG. 5 is an exploded perspective diagram illustrating blades and a rotating plate provided in a stop module according to an example.

A stop module 500 may be coupled to a lens module 200, and may be configured to selectively change the amount of light incident to the lens module 200.

The stop module 500 may allow a relatively low amount of light to be incident to the lens module 200 in a high illumination environment, and may allow a relatively large amount of light to be incident to the lens module 200 in a low illumination environment. The stop module 500 may maintain an image quality to be constant in various illumination conditions.

The stop module 500 may be coupled to the lens module 200 and may move in an optical direction, a first direction, and a second direction along with the lens module. The stop module 500 may allow the lens module 200 and the stop module 500 to move together during focus correction and shake correction, and a distance between the lens module 200 and the stop module 500 may not change.

Referring to FIGS. 4 and 5, in addition to FIGS. 2, 3A, and 3B, the stop module 500 may include a base 510, a plurality of blades 540, 550, and 560, and a stop driving portion including a magnet portion 520 having a driving magnet 521a and a driving coil 521b.

The stop module 500 may include the plurality of blades 540, 550, and 560. For example, the stop module 500 may include three or more blades. In the description below, an example in which three or six blades are provided will be described for ease of description.

First to third blades 540, 550, and 560 may have approximately a boomerang shape, and concave portions of the first to third blades 540, 550, and 560 may be disposed in a circle centered on an optical axis such that the first to third blades 540, 550, and 560 may form a circular or polygonal aperture. The inner concave portions of the first to third blades 540, 550, and 560 may be configured to form a hexagon, and the first to third blades 540, 550, and 560 may partially overlap with one another and form a hexagonal aperture. The inner portions of the blades forming the aperture may also be linear, and not concave or angled.

The first to third blades 540, 550, and 560 may slide while the first to third blades 540, 550, and 560 are partially in contact with one another, and thus, the first to third blades 540, 550, and 560 may be configured to be anti-static to prevent static electricity.

The first to third blades 540, 550, and 560 may be driven while being interlocked with a rotating plate 530.

The rotating plate 530 may be interlocked with the magnet portion 520 moving back and forth rectilinearly in a direction perpendicular to an optical axis direction, convert the linear movement of the magnet portion 520 to rotational movement, and rotate about an optical axis. The through-hole 531 may be provided in a central portion of the rotating plate 530 to allow light to penetrate through the through hole 531, and a size (diameter or area, for example) of the through hole 531 may be the same as or greater than a maximum size of the aperture formed by the first to third blades 540, 550, and 560. Also, the rotating plate 530 may contact the first to third blades 540, 550, and 560, and thus, the rotating plate 530 may be configured to be anti-static to prevent static electricity.

A guide groove 511 may be provided in the base 510 to guide the rotational movement of the rotating plate 530, and the rotating plate 530 may be inserted into the guiding groove 511 and guided by the guiding groove 511 while rotating. The rotating plate 530 may have a rounded edge, and a groove shaped portion 535 (a dodging groove) may be provided on the edge of the rotating plate 530 to prevent interference from adjacent members, such as fixed shafts 513a, 513b, and 513c, and the like. The guiding groove 511 may have a rounded edge to correspond to the rotating plate 530, and the fixed shafts 513a, 513b, and 513c may be provided in an inner circumferential portion on the edge of the guiding groove 511.

Even if the guiding groove 511 is not provided, driving shafts 533a, 533b, and 533c of the rotating plate 530 may be inserted into the three blades 540, 550, and 560, respectively, and thus, rotation may be smoothly induced.

The first to third blades 540, 550, and 560 may be interlocked with the rotating plate 530.

The first to third blades 540, 550, and 560 may have rotating shaft holes 543, 553, and 563 and driving shaft holes 545, 555, and 565, respectively, and the rotating shaft holes 543, 553, and 563 may be rotatably inserted into the fixed shafts 513a, 513b, and 513c provided in the base 510, respectively, and the driving shaft holes 545, 555, and 565 may be rotatably and movably inserted into the driving shafts 533a, 533b, and 533c on the rotating plate 530.

While the rotating shaft holes 543, 553, and 563, the driving shaft holes 545, 555, and 565, and the guide hole 532, and the like, in which the fixed shafts 513a, 513b, and 513c having a protruding shape, the driving shafts 533a, 533b, and 533c, and a driving protrusion 523 are inserted into to transfer force or to form a rotating shaft may include the term "hole" in their names, the rotating shaft holes 543, 553, and 563, the driving shaft holes 545, 555, and 565, and the guide hole 532 may have a hole shape or a groove shape. The rotating shaft holes 543, 553, and 563, the driving shaft holes 545, 555, and 565, and the guide hole 532 may also be referred to as "fixed shaft inserting portions 543, 553, and 563," "driving shaft inserting portions 545, 555, and 565," and "a driving protrusion inserting portion 532," respectively, herein.

The rotating shaft holes 543, 553, and 563 of the first to third blades 540, 550, and 560 may have a circular shape, and may only rotate while being inserted into the fixed shafts 513a, 513b, and 513c, and the driving shaft holes 545, 555, and 565 may be lengthened in one direction and be inserted into the driving shafts 533a, 533b, and 533c, and the driving shafts 533a, 533b, and 533c may move while being inserted into the driving shaft holes 545, 555, and 565. The driving shaft holes 545, 555, and 565 may be configured to be inclined to a rotating direction of the rotating plate 530.

The driving shafts 533a, 533b, and 533c may rotate in accordance with rotation of the rotating plate 530, and as the driving shafts 533a, 533b, and 533c inserted into the driving shaft holes 545, 555, and 565 of the first to third blades 540, 550, and 560 move, the first to third blades 540, 550, and 560 may be retracted inwardly or expanded outwardly, thereby implementing various sizes of the aperture 580 consecutively.

In the stop module 500, the rotating plate 530 may be provided in an inner portion of the stop module 500 with reference to the fixed shafts 513a, 513b, and 513c provided in the base 510. The rotating plate 530 may be configured to seal the fixed shafts 513a, 513b, and 513c.

As the fixed shafts 513a, 513b, and 513c are positioned in an outer portion with respect to the driving shafts 533a, 533b, and 533c, that is, being positioned further away from an optical axis than the driving shafts 533a, 533b, and 533c, the rotating shaft holes 543, 553, and 563 provided in the first to third blades 540, 550, and 560 may be positioned in an outer position with respect to the driving shaft holes 545, 555, and 565, that is, being positioned further away from an optical axis than the driving shaft holes 545, 555, and 565 to correspond to the positions of the fixed shafts 513a, 513b, and 513c.

The fixed shafts 513a, 513b, and 513c of the base 510 may be provided to correspond to the number of the blades 540, 550, and 560, and when the fixed shafts 513a, 513b, and 513c are sequentially connected, the fixed shafts 513a, 513b, and 513c may form a regular polygon. In the case in which three blades are provided, when the fixed shafts 513a, 513b, and 513c are sequentially connected, the fixed shafts 513a, 513b, and 513c may form a regular triangle.

For example, the first to third blades 540, 550, and 560 may be disposed in a circle in a circumference direction and form an aperture, and the first to third blades 540, 550, and 560 may be retracted inwardly or expanded outwardly (adjusted) and implement various sizes of the aperture 580 consecutively. The aperture 580 may have a circular shape or a polygonal shape depending on a shape of an inner circumferential surface of the first to third blades 540, 550, and 560.

Depending on surrounding environment of a camera, light may be allowed to be incident through one of the various sizes of apertures.

The stop driving portion may include the magnet portion 520 disposed in the base 510 to be movable along one axis, and the driving coil 521b fixed to the housing 110 to oppose the magnet portion 520.

The driving coil 521b may be provided in the substrate 900, and the substrate 900 may be fixed to the housing 110. The substrate 900 may be electrically connected to a printed circuit substrate attached to the bottom of the camera module 1000.

The magnet portion 520 may be a movable member, moving in an optical axis direction and first and second directions, and the driving coil 521b may be a fixed member, fixed to the housing 110.

As the driving coil 521b providing driving force to the stop module 500 is disposed in an outer portion of the stop module 500, that is, disposed in the housing 110 of the camera module, a weight of the stop module 500 may be reduced.

Since the driving coil 521b providing driving force to the stop module 500 is a fixed member, the driving coil 521b may not move during autofocusing adjustment or hand shake correction, and accordingly, an increase in weight of a lens module 200 caused by employing the stop module 500 may be significantly reduced.

Since the driving coil 521b providing driving force to the stop module 500 is disposed in the housing 110 and may be electrically connected to a printed circuit substrate, the driving coil 521b of the stop driving portion may not be affected even when the lens module 200 and the stop module 500 move during autofocusing adjustment and shake correction.

Accordingly, degradation in an autofocusing adjustment function may be prevented.

Also, a size of the aperture 580 of the stop may be consecutively changed, and thus, it may be necessary to accurately sense a position of the magnet portion 520 to accurately implement a size of an aperture. A position sensor 521c configured to be disposed to oppose the driving magnet 521a of the magnet portion 520 to determine a position of the driving magnet 521a may be provided. The position sensor 521c may be a hole sensor, and may be installed in a central portion of the driving coil 521b and fixed to the housing 110 or in an adjacent side portion. For example, the position sensor 521c may be provided in the substrate 900 in which the driving coil 521b is provided.

When the magnet portion 520 moves rectilinearly, a closed control method for sensing a position of the magnet portion 520 and providing a feedback of the position may be used. Thus, the position sensor 521c may be necessary to perform the closed control.

The substrate 900 may be configured to have a gyro sensor (not illustrated) sensing a cause of shaking such as a user hand-shake, and the like, and a driving circuit device (a driver IC, not illustrated) providing a driving signal to the coils 810b, 830b, 730, and 521b.

The base 510 may be configured to have a protrusion 512 in which the magnet portion 520 is disposed. The protrusion 512 may have a shape extended from the base 510 in an optical axis direction.

The magnet portion 520 may include the driving magnet 521a disposed to oppose the driving coil 521b and a magnet holder 522 to which the driving magnet 521a is attached. The driving magnet 521a may be provided to oppose the driving coil 521b in a direction perpendicular to an optical axis direction.

The magnet portion 520 may be coupled to the protrusion 512 of the base 510, and the lens module 200 may be configured to have a yoke (not illustrated) in a position opposing the magnet portion 520. Alternately, the yoke may be provided in the protrusion 512 of the base 510. By attraction force between the yoke (not illustrated) and the driving magnet 521a, the magnet portion 520 may slide while maintaining close contact with the protrusion 512.

To facilitate the sliding of the magnet portion 520, a support member 516 may be provided in the base 510 to support the magnet portion 520. The support member 516 may have a stick shape or a plate shape to facilitate the sliding movement.

Once power is applied to the driving coil 521*b*, the magnet portion 520 may move in a direction perpendicular to an optical axis direction by electromagnetic force generated between the driving magnet 521*a* and the driving coil 521*b*.

The base 510 may be configured to have a guiding groove 511 to guide rotational movement of the rotating plate 530, and the rotating plate 530 may be inserted into the guiding groove 511, and may rotate while being guided by the guiding groove 511.

The rotating plate 530 may be configured to have a guide hole 532 lengthened in one direction. The guide hole 532 may be lengthened to allow the magnet portion 520 to be inclined with respect to a movement direction.

Figure 9A:
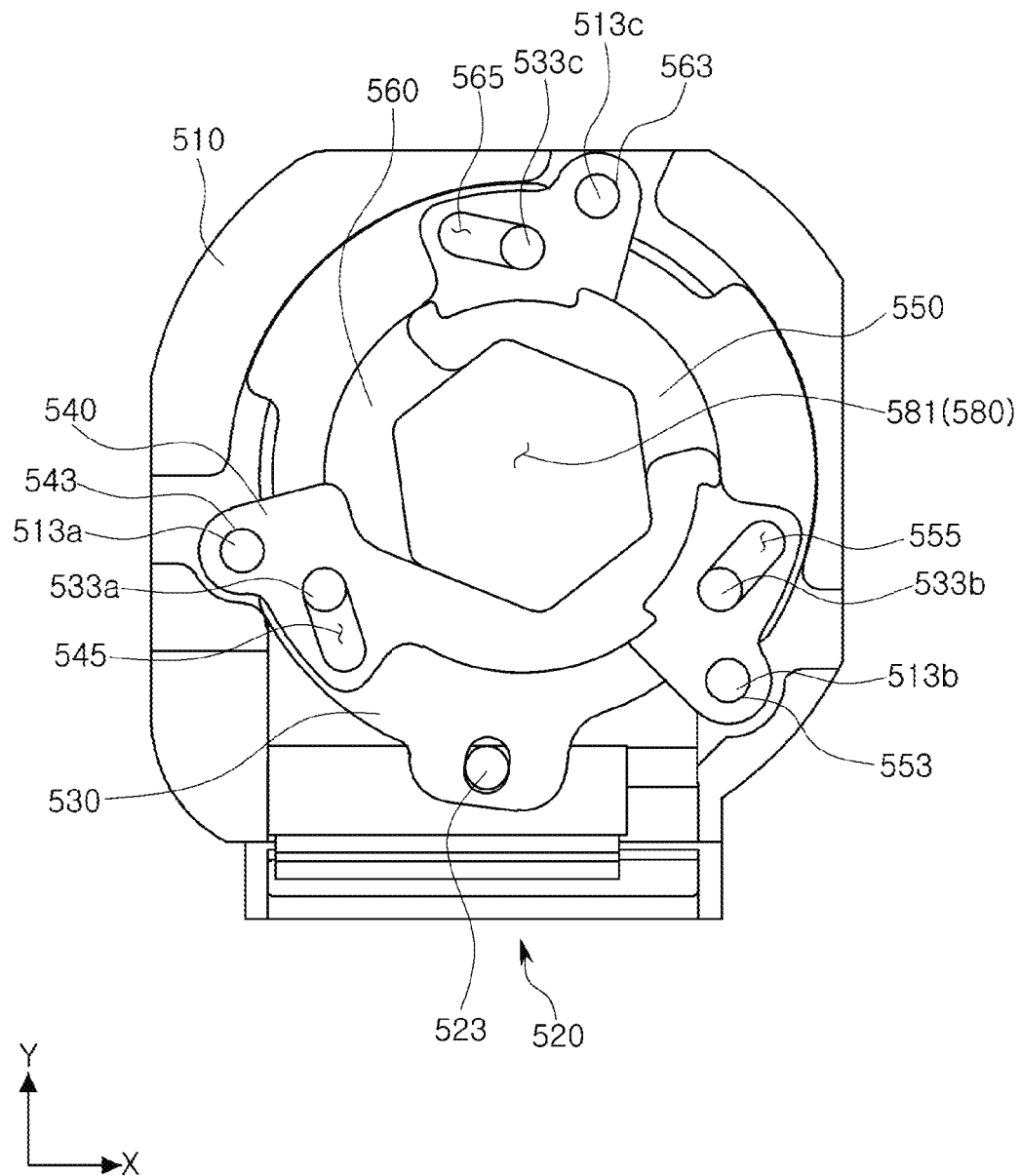
FIGS. 9A to 9C are top views illustrating a state in which a stop module is driven to consecutively change a size of an aperture according to an example.
Figure 9B:
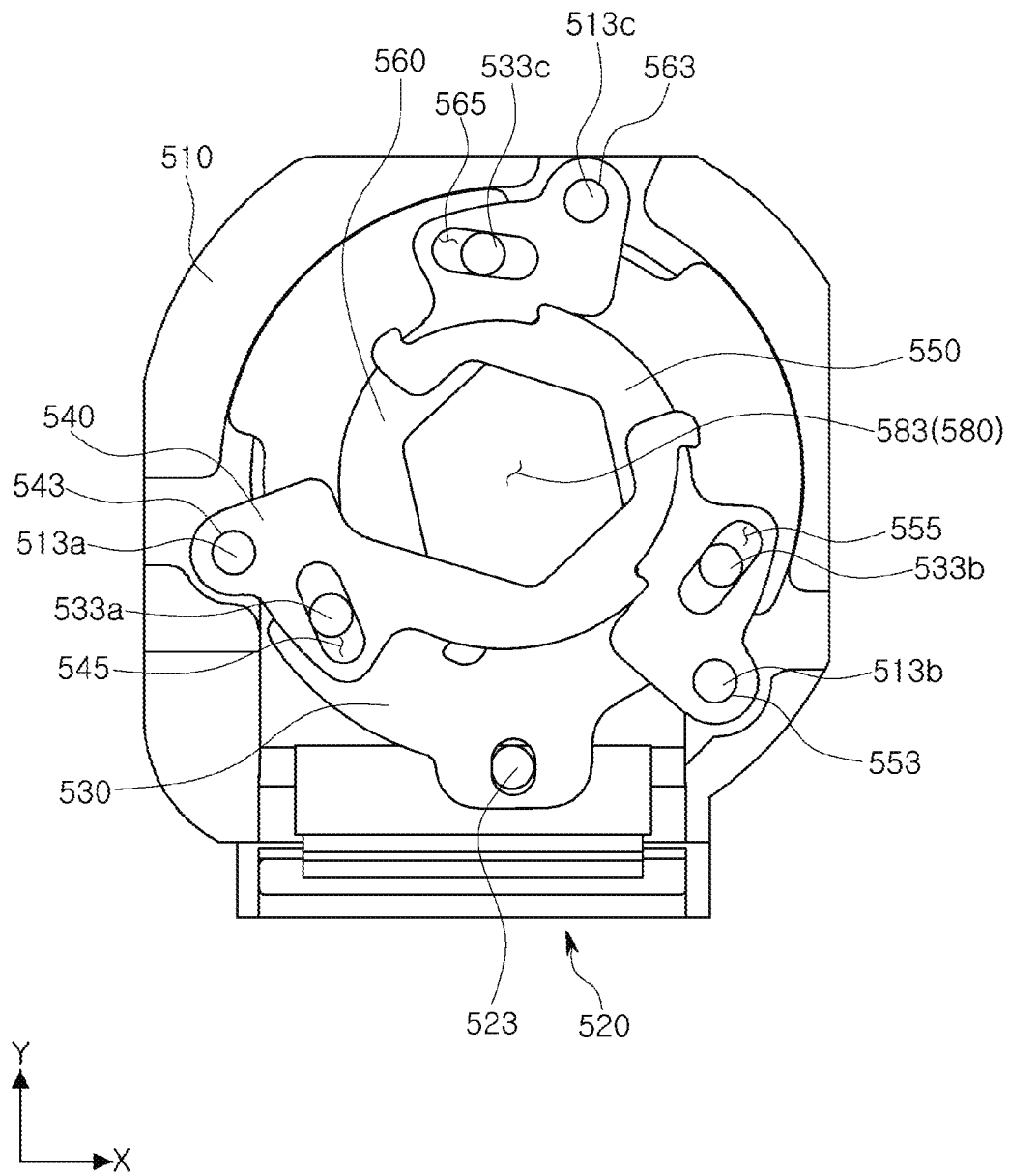
Figure 9C:
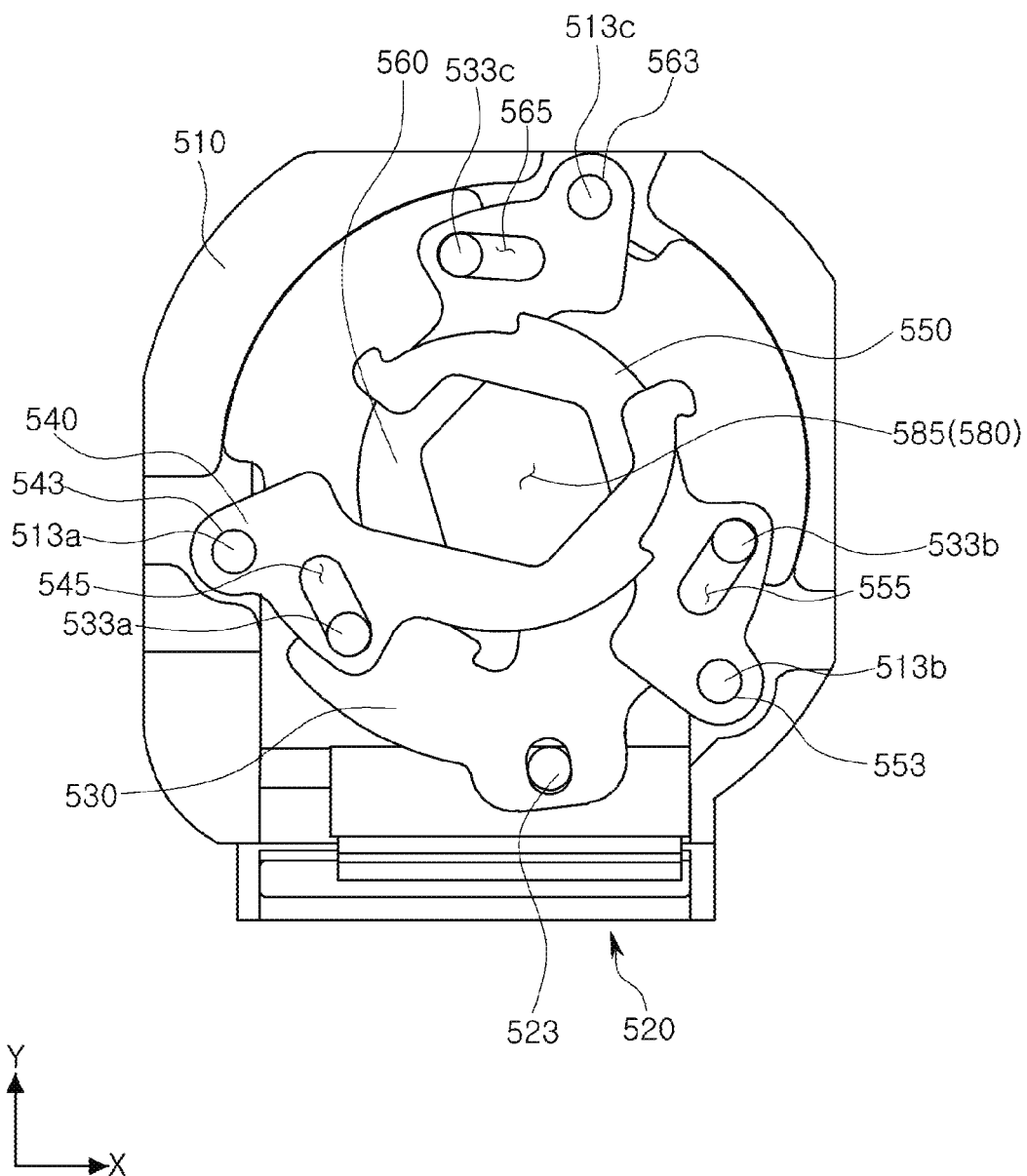

When the magnet portion 520 moves along one axis, the driving protrusion 523 provided in the magnet portion 520 may be moved within the guide hole 523, the rotating plate 530 may rotate inside the guiding groove 511 along the movement of the driving protrusion 523, and the first to third blades 540, 550, and 560 interlocked with the rotating plate 530 may be retracted or expanded, and a size of the aperture 580 can be consecutively (continually) changed (see FIGS. 9*a* to 9*c*).

Figure 6:
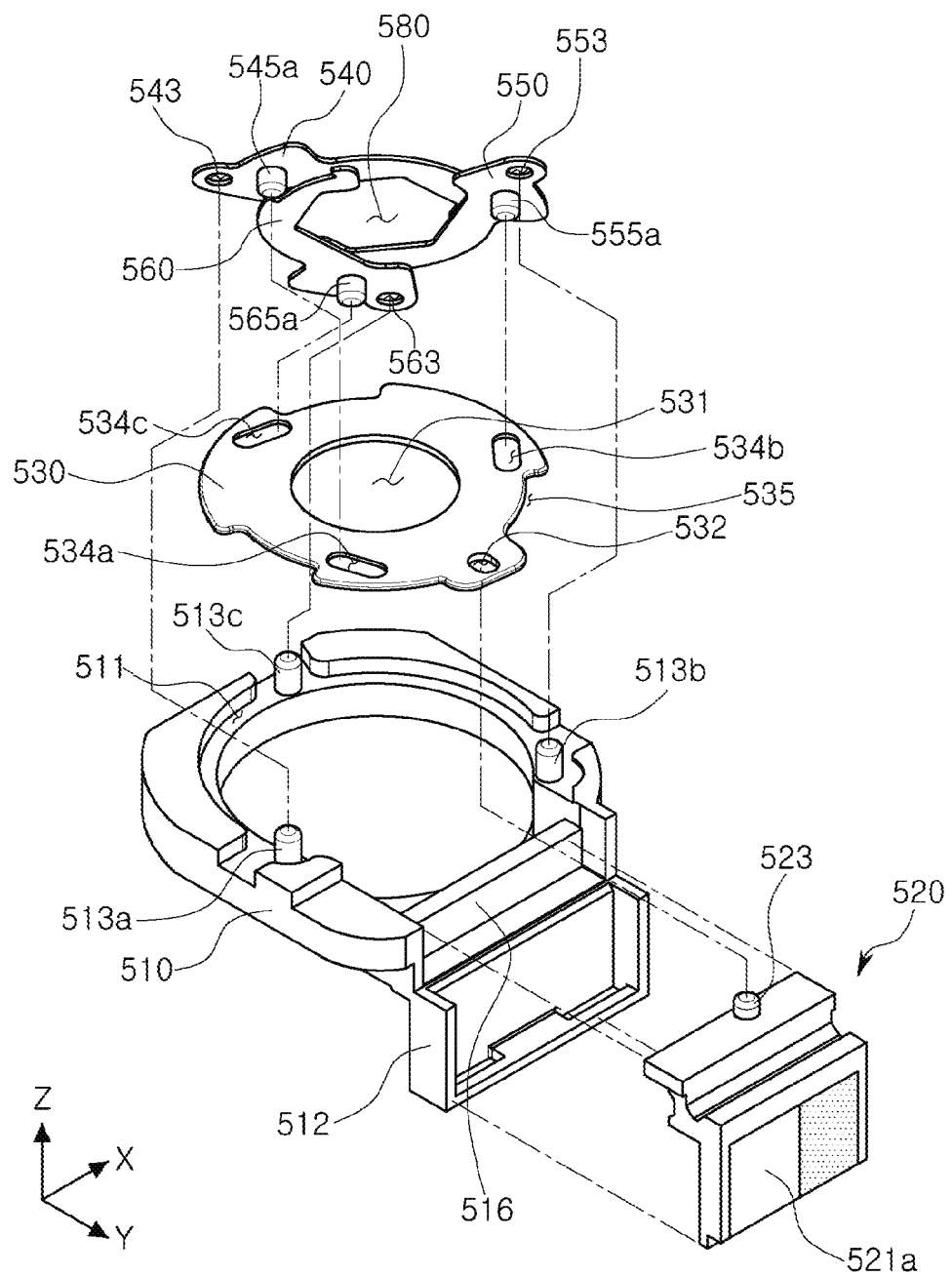
FIG. 6 is an exploded perspective diagram illustrating a blade and a rotating plate provided in a stop module according to an example.

FIG. 6 is an exploded perspective diagram illustrating a blade and a rotating plate provided in a stop module according to an example. A camera module in which a stop module is installed in FIG. 6 is the same as the camera module 1000 described with reference to FIGS. 1, 2, 3A, 3B, 4, and 5, and only a connecting portion between a rotating plate 530 and blades 540, 550, and 560 provided in the stop module may be different. In the description below, only different features will be described, the description of the same elements will not be repeated, and the same reference numerals will be used for the same elements.

Referring to FIG. 6, first to third blades 540, 550, and 560 may be driven while being interlocked with the rotating plate 530, and in the stop module, driving shafts 545*a*, 555*a*, and 565*a* having protrusion shapes may be provided in the first to third blades 540, 550, and 560, and driving shaft inserting portions 534*a*, 534*b*, and 534*c* having a groove shape or a hole shape may be provided in the rotating plate 530.

The driving shaft inserting portions 534*a*, 534*b*, and 534*c* in the rotating plate 530 may have a long shape inclined to a rotation direction. The driving shafts 545*a*, 555*a*, and 565*a* provided in the first to third blades 540, 550, and 560, respectively, may be inserted into the driving shaft inserting portions 534*a*, 534*b*, and 534*c*, and the driving shafts 545*a*, 555*a*, and 565*a* may move along the driving shaft inserting portions 534*a*, 534*b*, and 534*c* as the rotating plate 530 rotates. Accordingly, the first to third blades 540, 550, and 560 may be retracted inwardly (centered on an optical axis) or expanded outwardly, thereby consecutively implementing various sizes of the aperture 580.

Figure 7:
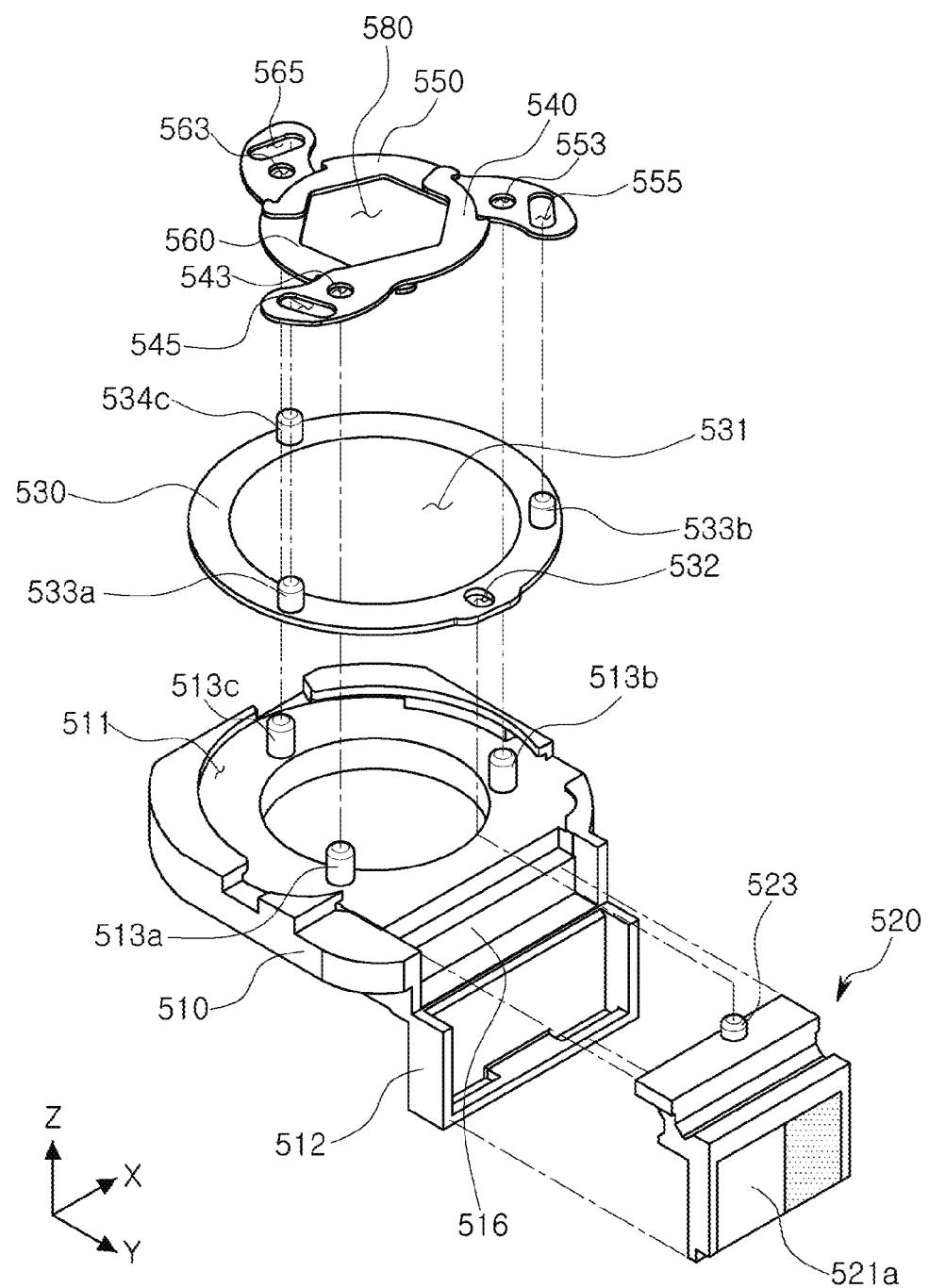
FIG. 7 is an exploded perspective diagram illustrating a blade and a rotating plate provided in a stop module according to an example.

FIG. 7 is an exploded perspective diagram illustrating a blade and a rotating plate provided in a stop module according to an example. A camera module in which a stop module is installed in FIG. 7 is the same as the camera module 1000 described with reference to FIGS. 1, 2, 3A, 3B, 4, and 5, and only a connecting portion between a rotating plate 530 and blades 540, 550, and 560 provided in the stop module may be different. In the description below, only different features will be described, the description of the same elements will not be repeated, and the same reference numerals will be used for the same elements.

Referring to FIG. 7, first to third blades 540, 550, and 560 may be driven while being interlocked with the rotating plate 530, and in the stop module, a rotating plate 530 may be provided in an outer portion with respect to fixed shafts 513*a*, 513*b*, and 513*c* provided in a base 510. The rotating plate 530 may be configured to seal externally of the fixed shafts 513*a*, 513*b*, and 513*c*, and the fixed shafts 513*a*, 513*b*, and 513*c* may be provided inside a through-hole 531 of the rotating plate 530.

Accordingly, as the fixed shafts 513*a*, 513*b*, and 513*c* are positioned in an inner portion than driving shafts 533*a*, 533*b*, and 533*c*, that is, being positioned closer to an optical axis than the driving shafts 533*a*, 533*b*, and 533*c*, rotating shaft holes 543, 553, and 563 provided in the first to third blades 540, 550, and 560 may be positioned in an inner portion with respect to driving shaft holes 545, 555, and 565, that is, being positioned closer to an optical axis than the driving shaft holes 545, 555, and 565.

Figure 8:
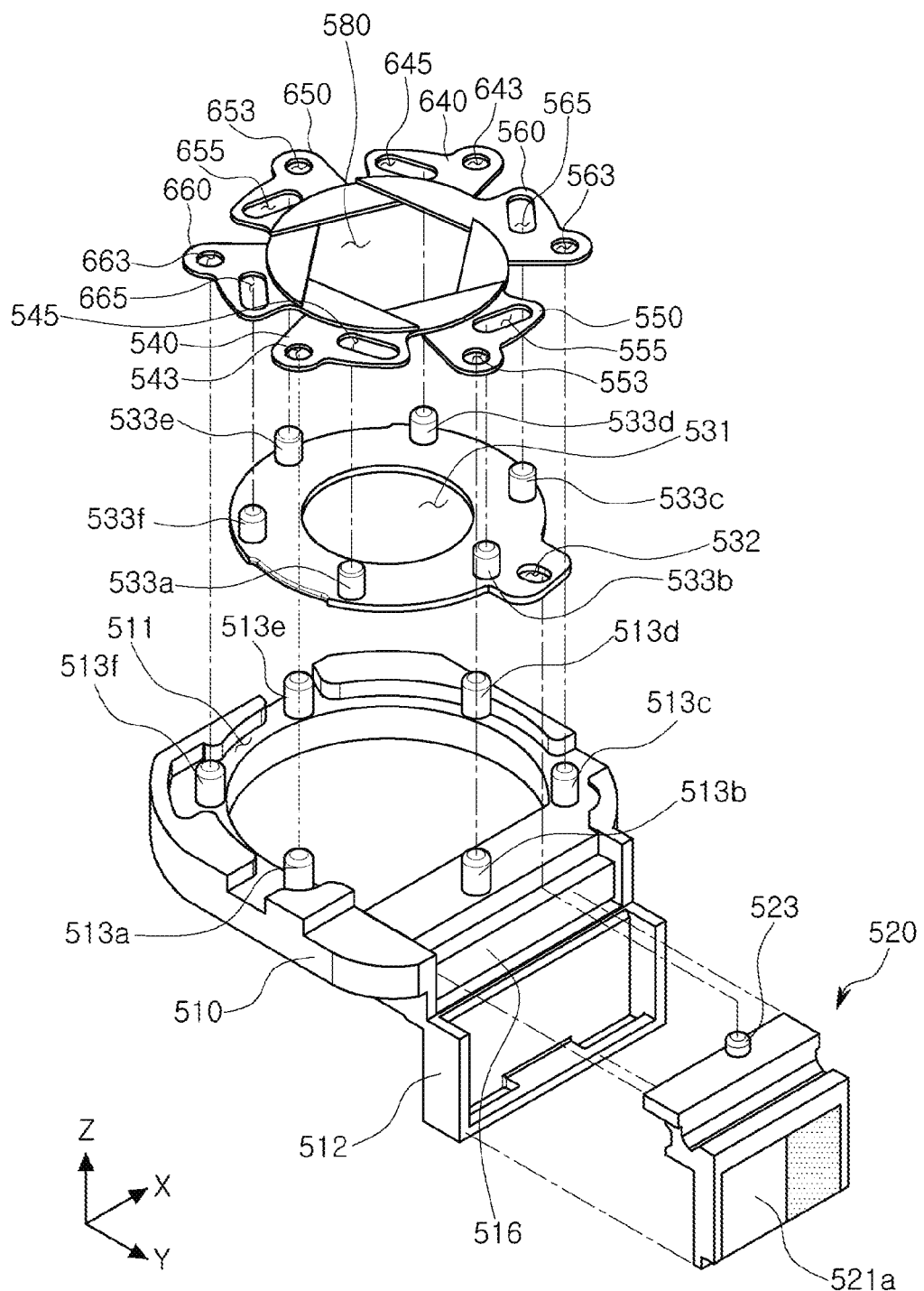
FIG. 8 is an exploded perspective diagram illustrating a blade and a rotating plate provided in a stop module according to an example.

FIG. 8 is an exploded perspective diagram illustrating a blade and a rotating plate provided in a stop module according to an example. A camera module in which a stop module is installed in FIG. 8 is the same as the camera module 1000 described with reference to FIGS. 1, 2, 3A, 3B, 4 and 5, and in the example in FIG. 8, six blades 540, 550, 560, 640, 650, and 660 are implemented. A basic shape of the blades 540, 550, 560, 640, 650, and 660 may be the same as the shape of the blades in FIGS. 1, 2, 3A, 3B, 4, and 5, and only a difference in the number of blades may be present. In the description below, only different features will be described, the description of the same elements will not be repeated, and the same reference numerals will be used for the same elements.

Referring to FIG. 8, first to six blades 540, 550, 560, 640, 650, and 660 may be driven while being interlocked with the rotating plate 530.

The first to six blades 540, 550, 560, 640, 650, and 660 may be configured to have rotating shaft holes 543, 553, 563, 643, 653, and 663, and driving shaft holes 545, 555, 565, 645, 655, and 665, respectively, the rotating shaft holes 543, 553, 563, 643, 653, and 663 may be rotatably inserted into fixed holes 513*a*, 513*b*, 513*c*, 513*d*, 513*e*, and 513*f* provided in a base 510, and the driving shaft holes 545, 555, 565, 645, 655, and 665 may be rotatably and movably inserted into driving shafts 533*a*, 533*b*, 533*c*, 533*d*, 533*e*, and 533*f*.

The rotating shaft holes 543, 553, 563, 643, 653, and 663 of the first to six blades 540, 550, 560, 640, 650, and 660 may be disposed in a circle and may rotate only while being inserted into the fixed holes 513*a*, 513*b*, 513*c*, 513*d*, 513*e*, and 513*f*, and the driving shaft holes 545, 555, 565, 645, 655, and 665 may be lengthened in one direction and inserted into the driving shafts 533*a*, 533*b*, 533*c*, 533*d*, 533*e*, and 533*f*, and the driving shafts 533*a*, 533*b*, 533*c*, 533*d*, 533*e*, and 533*f* may move while the driving shaft holes 545, 555, 565, 645, 655, and 665 are inserted therein. The driving shaft holes 545, 555, 565, 645, 655, and 665 may be configured to be inclined a to rotation direction of the rotating plate 530.

The driving shafts 533*a*, 533*b*, 533*c*, 533*d*, 533*e*, and 533*f* may rotate as the rotating plate 530 rotates, the driving shafts 533*a*, 533*b*, 533*c*, 533*d*, 533*e*, and 533*f* inserted into the driving shaft holes 545, 555, 565, 645, 655, and 665 of the first to six blades 540, 550, 560, 640, 650, and 660 may move, and the first to six blades 540, 550, 560, 640, 650, and 660 may be retracted inwardly or expanded outwardly, thereby consecutively implementing various sizes of the aperture 580.

The fixed holes 513a, 513b, 513c, 513d, 513e, and 513f may be provided to correspond to the number of the blades 540, 550, 560, 640, 650, and 660, and the fixed holes 513a, 513b, 513c, 513d, 513e, and 513f may be disposed to form a regular polygon when the fixed holes 513a, 513b, 513c, 513d, 513e, and 513f are sequentially connected. In the case in which six blades are provided, the fixed holes 513a, 513b, 513c, 513d, 513e, and 513f may form a regular hexagon when the fixed holes 513a, 513b, 513c, 513d, 513e, and 513f are sequentially connected.

In the case in which a hexagon is formed by the six blades 540, 550, 560, 640, 650, and 660, six internal linear lines (edges) of the blades 540, 550, 560, 640, 650, and 660 may form a hexagon.

FIGS. 9A to 9C are top views illustrating a state in which a stop module is driven to consecutively change a size of an aperture according to an example. FIGS. 9A to 9C illustrate a stop module 500 as an example.

Referring to FIG. 9a, when a magnet portion 520 is positioned in one end portion, a largest aperture 581 may be implemented by first to third blades 540, 550, and 560. As in the description below referring to FIGS. 9B and 9C, in the case in which magnet portion 520 moves from one end portion to the other end portion and returns to one end portion, the small apertures 583 and 585 may be changed to the largest aperture 581 by the first to third blades 540, 550, and 560.

Referring to FIG. 9C, when the magnet portion 520 moves to the other end portion opposing one end portion by driving a stop driving portion, the smallest aperture 585 may be implemented by the first to third blades 540, 550, and 560.

Referring to FIG. 9B, when the magnet portion 520 moves between one end portion and the other end portion by driving the stop driving portion, the aperture 583 having a random size between the largest aperture 581 and the smallest aperture 585 may be implemented by the first to third blades 540, 550, and 560 in various manners.

As set forth above, the stop module 500 may consecutively implement apertures having various sizes by the magnet portion 520 moving back and forth rectilinearly.

As described in the aforementioned examples, the camera module may selectively change the amount of incident light using a stop module, an autofocusing adjustment function may not be degraded even when a stop module is mounted, and an increase in weight caused by employing a stop module may be significantly reduced.

As described above, a camera module may maintain performances of an autofocusing function and a hand shake correction function by significantly reducing an increase in weight of a driving portion even when a stop module is mounted.

Also, various sizes of apertures may be accurately implemented using a simplified structure.

A camera module according to the various examples may be provided in a portable electronic device such as a mobile communications terminal, a smartphone, a tablet PC, or the like.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing comprising a lens module;
blades disposed on an object side of the lens module and configured to consecutively form apertures having various sizes;
a magnet portion comprising a driving magnet opposing a driving coil and configured to be moveable rectilinearly, the driving magnet opposing the driving coil in a direction that intersects an optical axis direction; and
a rotating plate interlocked with the magnet portion and the blades, and configured to convert linear movement of the magnet portion to rotational movement.

2. The camera module of claim 1, further comprising a base configured to accommodate the rotating plate, the base comprising a protrusion extended in the optical axis direction along a side surface of the lens module.

3. The camera module of claim 2, wherein the magnet portion is disposed in the protrusion and is configured to move back and forth in a direction approximately perpendicular to the optical axis direction.

4. The camera module of claim 3, wherein the blades consecutively form the apertures having the various sizes by expanding and retracting around the optical axis according to a movement of the magnet portion with respect to the protrusion.

5. The camera module of claim 2, wherein the rotating plate is configured to rotate about an optical axis.

6. The camera module of claim 5, wherein each of the blades comprises a fixed shaft inserting portion and a driving shaft inserting portion, the fixed shaft inserting portion is rotatably inserted into a respective fixed shaft on the base, and the driving shaft inserting portion is inserted into a respective driving shaft on the rotating plate.

7. The camera module of claim 6, wherein the driving shaft inserting portion is lengthened in one direction and inclined to a rotation direction of the rotation plate.

8. The camera module of claim 6, wherein a number of fixed shafts on the base correspond to a number of the blades, and when the fixed shafts are sequentially connected, the fixed shafts form a regular polygon.

9. The camera module of claim 6, wherein the rotating plate is disposed closer to the optical axis than the fixed shafts.

10. The camera module of claim 6, wherein the rotating plate is disposed farther away from the optical axis than the fixed shafts.

11. The camera module of claim 5, wherein each of the blades comprises a fixed protrusion inserting portion and a driving shaft, the fixed shaft protrusion portion is rotatably inserted into a respective fixed shaft on the base, and the driving shaft is inserted into a respective driving shaft inserting portion on the rotating plate.

12. The camera module of claim 1, wherein the driving coil is disposed in the housing.

13. The camera module of claim 1, further comprising a position sensor disposed to oppose the driving magnet.

14. The camera module of claim 1, wherein the blades comprise three blades or six blades.

15. The camera module of claim 1, wherein the rotating plate is separate from the magnet portion.

16. A camera module, comprising:
a housing comprising a lens module;
blades disposed on an object side of the lens module and configured to consecutively form apertures having various sizes;
a magnet portion comprising a driving magnet opposing a driving coil and configured to be moveable rectilinearly; and
a rotating plate interlocked with the magnet portion and the blades, and configured to convert linear movement of the magnet portion to rotational movement,
wherein the rotating plate comprises a driving protrusion inserting portion, the magnet portion comprises a driving protrusion, and the driving protrusion is inserted into the driving protrusion inserting portion.

17. The camera module of claim 16, wherein the driving protrusion inserting portion is inclined to a movement direction of the magnet portion.

18. A camera module, comprising:
a lens module;
a magnet portion comprising a driving magnet opposing a driving coil and configured to be moveable rectilinearly, the driving magnet opposing the driving coil in a direction that intersects an optical axis direction;
a rotating plate interlocked with the magnet portion, and configured to convert linear movement of the magnet portion to rotational movement;
blades disposed on an object side of the lens module and interlocked with the rotating plate, the blades being configured to expand and retract around an optical axis based on the rotational movement.

19. The camera module of claim 18, wherein the blades are configured to expand and retract around the optical axis to form a variably sized aperture.

20. The camera module of claim 18, wherein at least two of the blades overlap each other in an optical axis direction.

* * * * *